May 8, 1923.
J. G. LUKACS
AIRSHIP
Filed Aug. 1, 1921
1,454,059
3 Sheets-Sheet 3
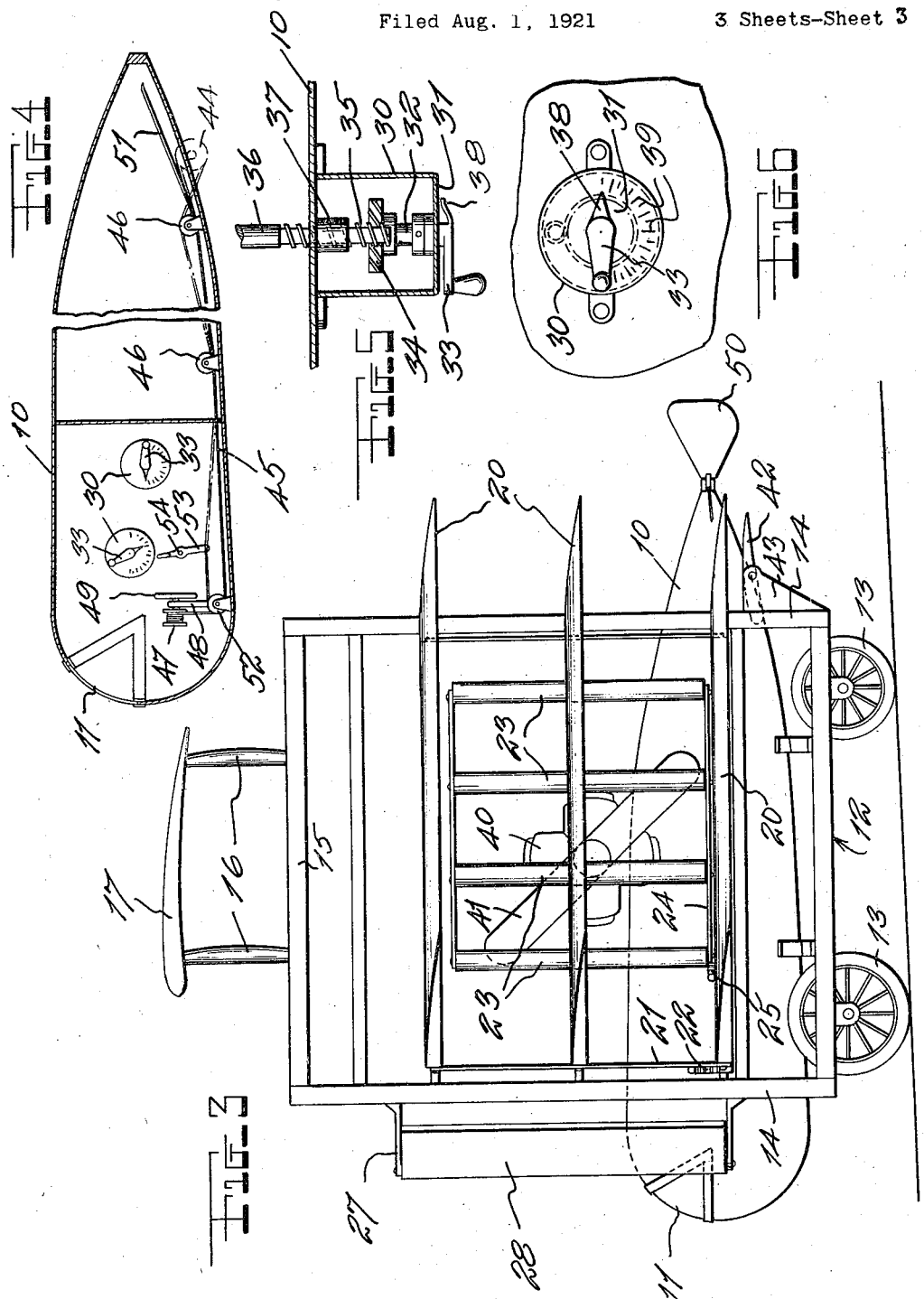
INVENTOR
John G. Lukacs
BY
ATTORNEY Patented May 8, 1923.

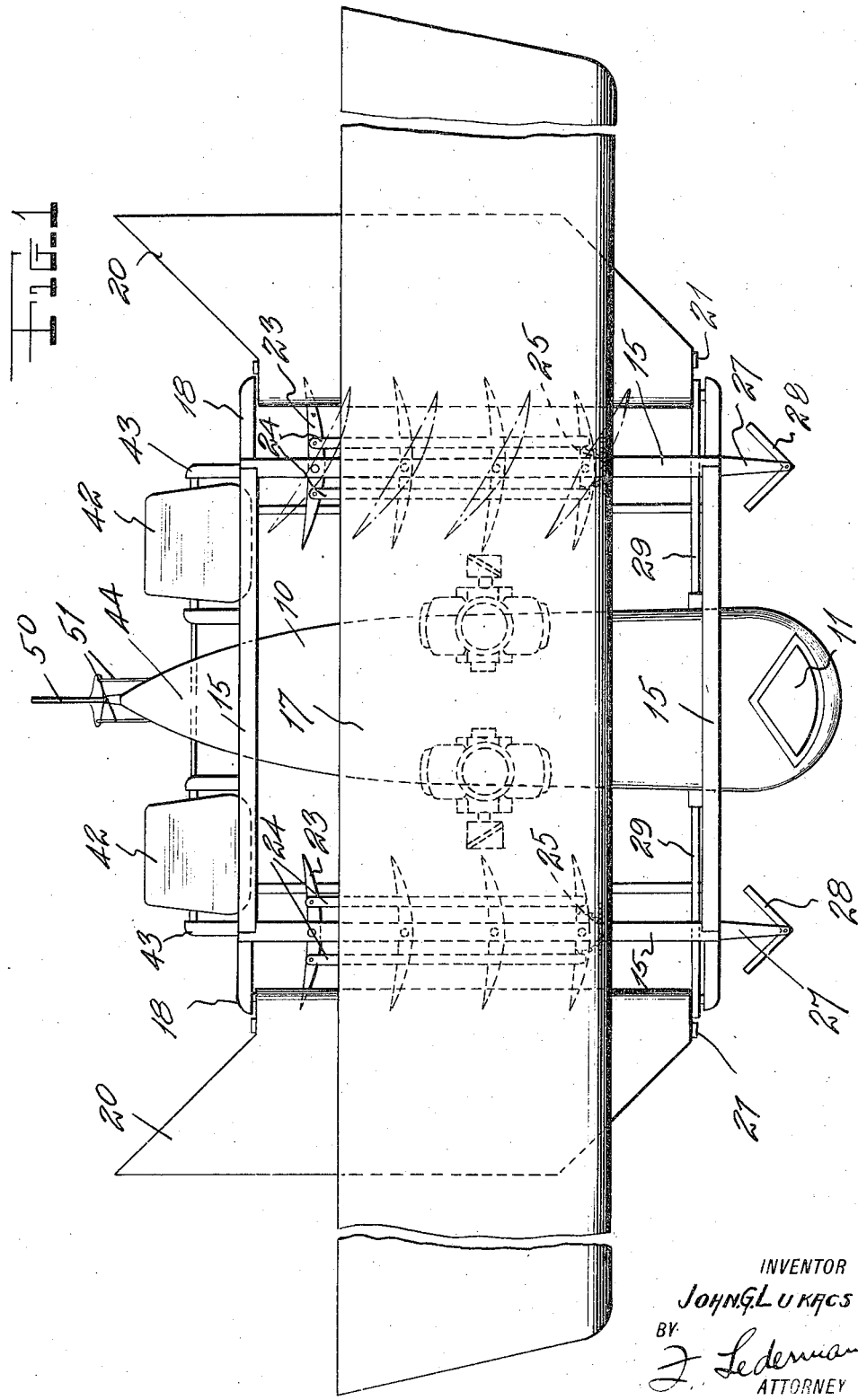

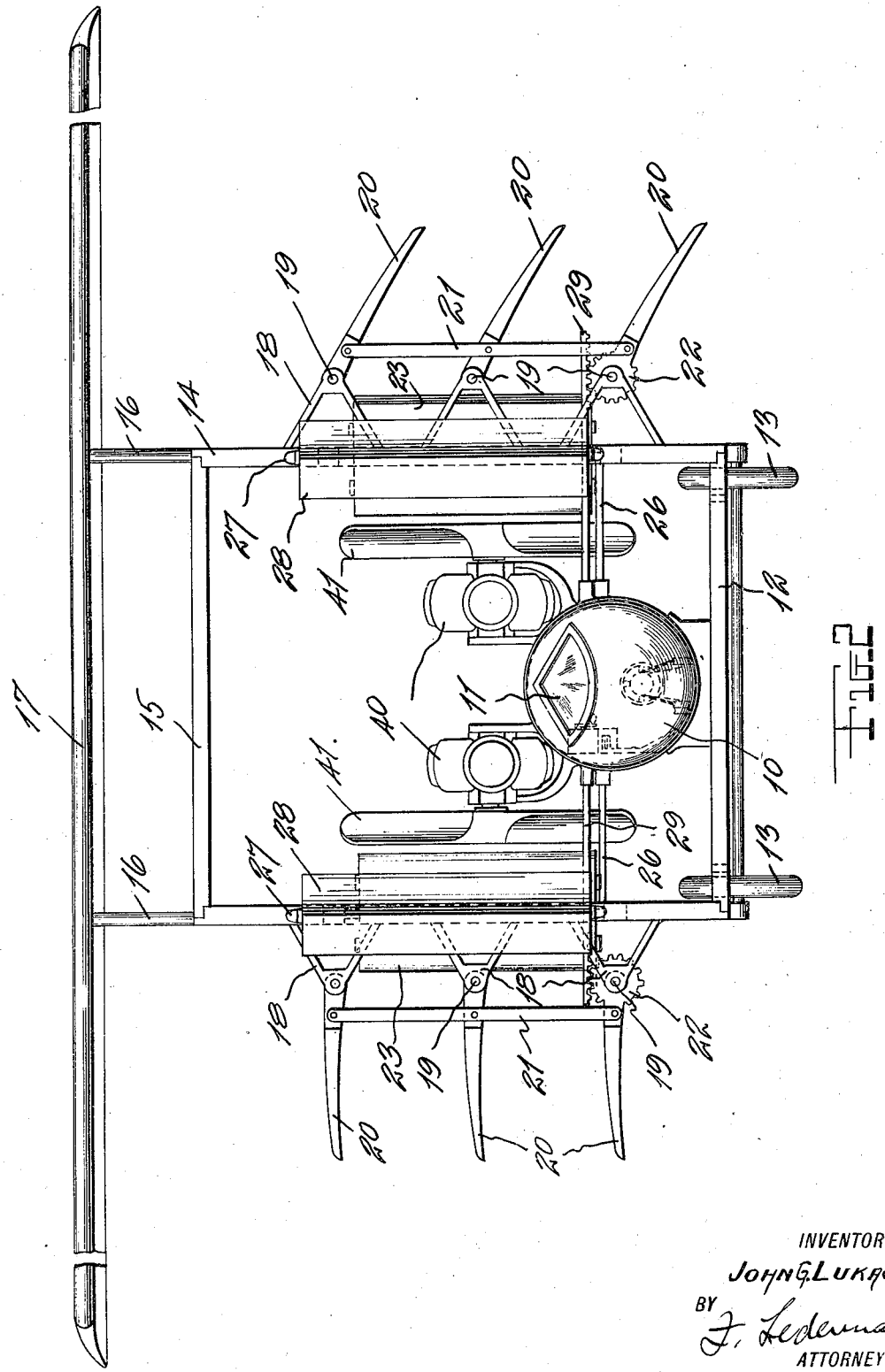

1,454,059

UNITED STATES PATENT OFFICE.

JOHN G. LUKACS, OF NEW YORK, N. Y.

AIRSHIP.

Application filed August 1, 1921. Serial No. 488,854.

*To all whom it may concern:*

Be it known that I, JOHN G. LUKACS, a citizen of the United States, residing at New York, in the county of New York and State of New York, have invented certain new and useful Improvements in Airships, of which the following is a specification.

This invention relates to improvements in flying machines and has for its principal object to provide a heavier than air type machine which is so designed as to attain relatively high altitude at a minimum expenditure of power.

Another object of the invention is to provide a flying machine which can ascend perpendicularly and which further can remain stationary relative to both altitude and direction.

Another object of the invention is to provide a novel controlling means for directing the flight of the machine, and to provide a safe and sure balancing mechanism wherein the balance is maintained by varying the horizontal position of certain of the planes, so as to reduce or increase their active area.

Another object of the invention is to produce a propelling mechanism which serves at the same time as the steering means of the aerial vessel.

A further object of the invention resides in the provision of a device having a series of simultaneously movable air foils so arranged as to direct the horizontal direction of flight, which are so arranged as to permit the device to turn on relatively short radii and thereby materially increase the maneuvering of the plane.

A still further object of the invention is to provide controls having indicating means cooperatively associated therewith, so that the operator may at a glance determine in what position the various control planes are.

With the above and other objects in view the invention consists in the novel construction, combination and arrangement of parts which will be fully set forth in the following specification, claimed, and illustrated in the accompanying drawing, in which, Figure 1, is a top plan view of this improved flying machine, Figure 2, is a front view in elevation of Figure 1, Figure 3, is a side view in elevation of Figure 1, Figure 4, is a longitudinal sectional view through the fuselage, showing the various controls and their relative position, Figure 5, is an enlarged detail sectional view through one of the control elements, and Figure 6, is an end view in elevation of Figure 5.

Referring to the drawings in detail the numeral 10, designates the fuselage which is preferably cigar shaped and provided at its forward end with a transparent window 11 for observation purposes. As the fuselage is of relatively large capacity and adapted for either passenger or commercial service, it is therefore essential that it be perfectly stream-lined so as to minimize the head resistance as much as possible. For this reason it is constructed substantially as shown in Figures 1, 2, and 3. The forward or entering end is shown spherical in shape and the body of which has a slight taper until well past the centre of the body, when it tapers off abruptly to a point. It will be understood that the fuselage has a compartment at the forward end thereof which will readily house the aviator and mechanician together with the necessary control devices which will be more fully hereinafter described.

As shown in Figures 2 and 3, the fuselage is supported on a suitable chassis 12, which comprises a rectangular frame mounted on the wheels 13 and having extending upwardly from each corner the struts 14 which are connected at their upper ends by cross bars 15. Secured at their lower ends to the cross bars at the sides of the device are the struts 16, the upper ends of which are secured to the main sustaining plane 17 of the usual construction. As shown in Figure 2 this main plane projects well beyond the sides of the frame previously described to provide the necessary area or wing spread.

Secured at spaced intervals to the vertically extending struts 14 are brackets 18 in the outer ends of which are rotatably mounted the shafts 19, to which the balancing planes 20 are attached. These balancing planes are connected together for simultaneous movement at opposite sides of the machine by links 21 and secured to the lowermost shaft 19 is a pinion 22, the use of which will be more fully described hereinafter.

Inasmuch as the balancing planes are disposed at a substantial distance from each other, they serve at the same time as lateral balancing means.

Pivoted between the upper and lower cross bars at opposite sides of the main frame is a series of steering planes 23 which are connected together for simultaneous movement by links 24.

A pinion 25 is secured to the foremost pivot of the vertical steering planes and meshes with a rack bar 26 which is horizontally movable through the wall of the fuselage 10. It will be understood that each independent set of planes is provided with its respective actuating rack bar and thus it will be seen that each set may be independently moved. In order to reduce the wind resistance of the steering planes 23, suitable brackets 27 are attached to the front struts 14 and support V-shaped deflectors 28, which act to cut the atmosphere and reduce its resistance to a minimum.

Meshing with the pinion 22 are rack bars 29 which enter the sides of the fuselage and are actuated by the control mechanism best illustrated in Figures 5 and 6. Similar control mechanisms are provided for the rack bars 26 and it will be seen that the operator may at all times be advised of the position of his various planes by a glance at the indices on the control mechanism.

The control mechanism above referred to comprises a hollow cylindrical housing 30 which is closed at one end as at 31. This end closure is provided with a central aperture through which the shaft 32 is rotatably mounted. A crank handle 33 is secured to the outer end of the shaft 32, while its inner end carries a worm gear 34 which meshes with a worm 35 on the inner end of shaft 36. This shaft 36 is threaded through a collar 37 secured to the inner side of the fuselage 10 and its outer end is swivelly connected to one of the rack bars previously described. As shown in Figures 5 and 6, each crank handle 33 is provided with a pointer 38 which cooperates with the indices 39 on the outer side of the end closure 31. It will thus be seen that the operator may readily determine the positions of his various planes by a mere glance at the pointers.

Propulsion of the machine is had by means of suitable motors 40, preferably of the "Gnome" rotary type, which are mounted in brackets arranged at opposite sides of the fuselage. Propellers 41 are secured to and driven by the motors and it will be seen that the gyroscopic action of said motor will tend to maintain the proper balance of the machine when flying. It is to be noted that, since the propellers rotate in planes parallel to the direction of travel of the vessel, obviously they offer the least resistance to the air, and increase thus the speed of the device.

In order to control the elevation of the machine in the "take off" the elevators 42 are pivotally mounted in brackets 43 at the rear of the machine and secured to the supporting shaft of said elevators is a drum 44 around which a cable 45 passes. This cable is preferably wound upon the drum for a few turns and then passes over a series of guide pulleys or idlers 46 to the forward end of the fuselage, at which point it is wound upon the drum 47 which is mounted for rotation in a bracket 48 and is cooperatively connected to a hand wheel 49, by means of which its movements are controlled.

A rudder 50 is pivotally attached to the rear end of the fuselage and is connected to a cable 51 which leads forwardly over suitable idler pulleys to the pulley 52 arranged near the end of the fuselage. This cable 51 passes around the said pulley 52 and is connected to a lever 53 which is pivotally connected as at 54 to the side of the fuselage. It will thus be seen that the horizontal direction of flight may be controlled by the manipulation of the lever as well as by the operation of the planes 23 and thus an auxiliary steering means is provided.

While in the foregoing there has been shown and described the preferred embodiment of this invention it is to be understood that certain minor changes in the details of construction, combination and arrangement of parts may be resorted to without departing from the spirit and scope of the invention as claimed.

The operation of the device is as follows:

It seems it is necessary to describe only the function and operation of the planes 23 in cooperation with the propellers 41 since the operations of the other elements of the vessel are well known. In starting the ascent of the vessel all planes 23 are shifted into the positions in which they are shown in Figure 1, of the drawings on the left side of the vessel frame. The engine is then started and the elevating planes 43 set to cause the vessel to ascend. The propellers force the air toward the planes 23 by which it is deflected and caused to move toward the rear of the aerial vessel in a forward direction, thereby causing the same to move in. The speed of the vessel may be changed by varying the exposed surfaces of the planes 23 relative to the propellers, more particularly the more the said planes are shifted to closing positions, the greater the speed of the vessel, and the more they are shifted to opening positions, that is to say the nearer they are brought into position shown on the right side of the device in Figure 1, of the drawings the slower the speed of the device. From this it appears that in order to change the speed of the vessel, it is not necessary to change the speed of the engine thereof.

Perpendicular flight with this device is accomplished as follows:

The planes 20 are adjusted to the position shown on the left side of the device in Figure 2, and planes 23, should be in the position shown on the left side of the device in Figure 1. With the aforesaid planes in the described positions it is obvious that the air wash or disturbed air created by rotation of propeller blades 41 will be guided outwardly by the planes 23 to the under side of the planes 20 thereby becoming sustaining air strata for perpendicular flight.

What is claimed is:—

1. A flying machine comprising a sustaining plane, horizontally disposed vertically adjustable balancing planes associated therewith, and vertically disposed horizontally adjustable steering air foils associated therewith, and a plane adjusting means associated with each set of planes comprising a threaded shaft, a threaded collar for receiving the shaft, a gear for driving the shaft, a crank for rotating the gear, and means for indicating the position of the planes with which the shaft is connected.

2. A flying machine comprising a sustaining plane, a fuselage supported thereby, horizontally disposed vertically adjustable planes associated therewith, vertically disposed horizontally adjustable steering air foils associated therewith, and means to move the planes, comprising, a threaded shaft, a threaded collar for receiving the shaft, a gear for driving the shaft, means for rotating the gear, and means for indicating the position of the planes with which the shaft is connected.

3. A flying machine comprising, a sustaining plane, a fuselage supported thereby, horizontally pivoted independently movable balancing planes associated therewith, vertically pivoted horizontally steering air foils associated therewith, a propulsion means, and means within the fuselage for independently adjusting the various sets of planes, comprising, a threaded shaft, a threaded collar for receiving the shaft, a gear for driving the shaft, a crank for rotating the gear, and means on the crank for indicating the position of the planes with which the shaft is connected.

4. A flying machine comprising, a fuselage, a sustaining plane associated therewith, a horizontally pivoted vertically adjustable set of balancing planes on each side of the fuselage, a set of vertically pivoted horizontally adjustable steering air foils on opposite sides of the fuselage, propulsion means for the machine, means associated with the fuselage for independently adjusting each set of planes, comprising, a threaded shaft, a threaded collar for receiving the shaft, a gear for driving the shaft, means for rotating said gear, and indicating means associated with the machines, and indicating means associated with the plane adjusting means whereby the operator may determine the position of the planes with ease.

5. The combination with a flying machine having a sustaining plane, a propulsion means, a fuselage, sets of balancing planes on opposite sides of the fuselage, and sets of steering planes on opposite sides of the fuselage, of a plane adjusting means associated with each of the set of planes comprising, a threaded shaft, a threaded collar for receiving the shaft, a gear for driving the shaft, a crank for rotating the gear, and indicating means on the crank for indicating the position of the planes with which the shaft is connected.

6. A flying machine comprising a sustaining plane, a fuselage associated therewith, horizontally pivoted vertically movable balancing planes on opposite sides of the fuselage, vertically horizontally adjustable steering air foils on the opposite sides of the fuselage, pinions connected with the pivots of the planes, and rack bars meshing with the pinions for adjusting the positions of the planes.

In witness whereof I affix my signature.

JOHN G. LUKACS.